(No Model.)
R. A. SMALL.
TOOL STOCK OR HANDLE.
No. 299,428. Patented May 27, 1884.
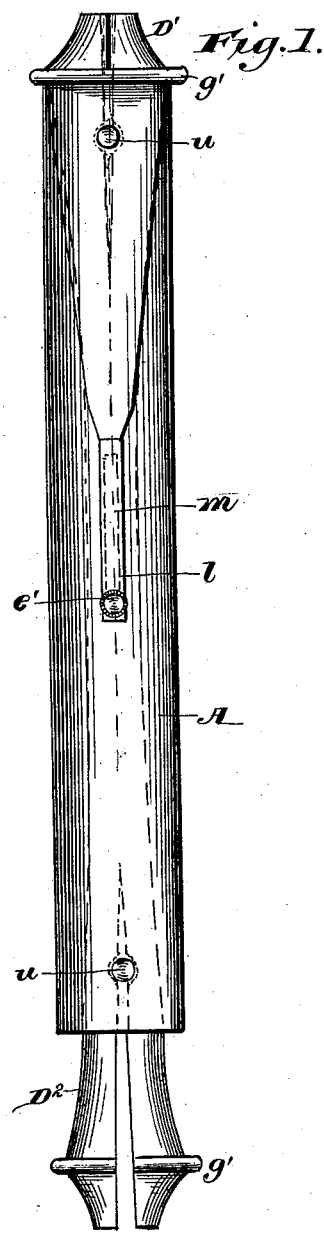
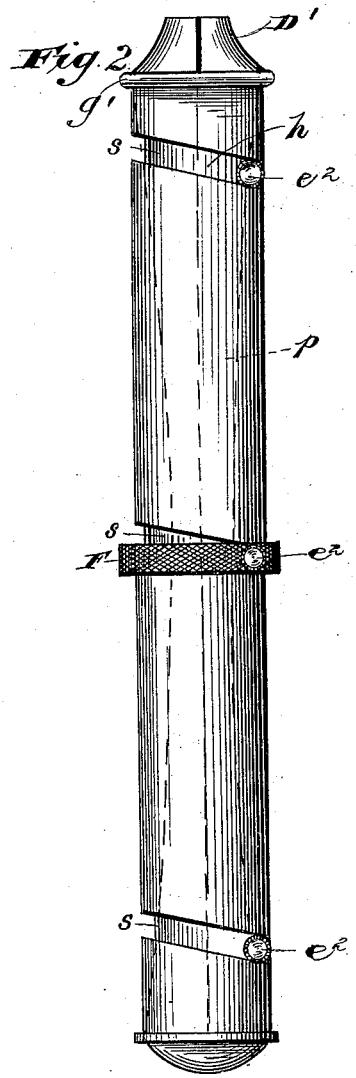
Witnesses:
Charles S. Hyer.
J. A. Rutherford
Inventor:
Robert A. Small,
By James L. Norris.
Atty.

UNITED STATES PATENT OFFICE.

ROBERT A. SMALL, OF JEFFERSONVILLE, INDIANA.

TOOL STOCK OR HANDLE.

SPECIFICATION forming part of Letters Patent No. 299,428, dated May 27, 1884.

Application filed June 12, 1883. (No model.)

*To all whom it may concern:*

Be it known that I, ROBERT A. SMALL, a citizen of the United States, residing at Jeffersonville, in the county of Clarke and State of Indiana, have invented new and useful Improvements in Tool Stocks or Handles, of which the following is a specification.

This invention has for its object to provide a novel tool handle or stock, whereby a pair of jaws may be caused to protrude from a hollow stock to receive the shank of a tool or other implement, and then be drawn into the stock to grasp and hold the tool to permit it to be manipulated.

The invention consists in the combination and construction of parts hereinafter described and claimed, and illustrated in the accompanying drawings, in which—

Figure 1 is a side elevation of the tool stock or handle, and Fig. 2 a similar view of a modification.

Referring to Fig. 1 of the drawings, the letter A indicates a tubular stock or handle in the form of a cylinder open at each end, within and projecting from the open extremities of which are arranged two pairs of jaws, $D'$ $D^2$, having collars $g'$, from which the shanks of the jaws taper inwardly. The adjacent faces of each pair of jaws are formed with openings of such size and shape as to receive the shank of a tool or other implement, and the jaws are preferably connected together adjacent to the center of the stock by a screw or otherwise, so that when such jaws are moved longitudinally, one pair will be drawn into the tubular stock until their collar $g'$ bears upon the open end of the stock, and the other pair will be projected from the stock, and, owing to the inherent elasticity of the jaws, the projected pair will separate or open for the purpose of receiving the shank of a tool.

For the purpose of adjusting the jaws, as alluded to, the tubular stock is provided at about midway of its length with a slot, $l$, through which projects a pin, $e'$, secured to the shanks or inner extremities of the jaws, and a slide-piece, $m$, may be attached to the pin for the purpose of covering the slot and moving the pin, all in such manner that by pushing the said pin back and forth the jaws are alternately moved into and out of the stock.

In order to throw the jaws open when protruded to receive a tool, I arrange adjacent to each end of the tubular stock a stud, $u$, which passes transversely through or into the stock between the pair of jaws, the adjacent faces of the latter being so arranged or constructed that the intervening space will be of tapering form, whereby, when one pair of jaws is pushed outward, the stud will act to force them apart or separate them sufficiently to receive the shank of the tool or release the latter, after which such pair of jaws is drawn into the stock until their collar $g'$ rests on the end thereof, the binding action of the stock on the jaws closing the latter together, and causing them to firmly grasp and hold the tool.

Two tool-stocks of the construction above described may be conveniently employed—one for holding the work by the left hand, and the other for holding the tool to be used in the right hand.

In Fig. 2 I have shown but one pair of jaws in the tubular stock A, the other end of the latter being closed by a suitable cap; and instead of moving the jaws by a pin and slot, as in Fig. 1, I construct the stock with spiral or curved slots $s$, into which project studs $e^2$, secured to the shank of the jaws. A ring, F, encircling the tubular stock, and attached to the central stud, $e^2$, is employed for causing said studs to traverse the spiral or curved slots, and thereby actuate the jaws.

What I claim is—

1. The combination, with a tubular stock open at both ends, of clamping-jaws projecting from each end of the stock, said jaws being connected together and of greater length than the stock, whereby when one pair of jaws are drawn into the stock and clamped the other pair are protruded from the opposite end and released, substantially as described.

2. The combination, with a hollow tubular stock, of two pairs of clamping-jaws set therein, and constructed so that when drawn into the end of the stock the jaws will be clamped, a pin rigid with said jaws and protruding through a slot in the stock, and means for actuating said pin within the slot to throw the jaws in and out, substantially as described.

3. The combination, with the tubular stock, of grasping-jaws set within its open end, a pin rigid with the jaws and traveling in a slot in the stock, and a stud rigid on the stock and projecting inwardly between the jaws, substantially as and for the purpose described.

In testimony whereof I have hereunto set my hand in the presence of two subscribing witnesses.

ROBERT A. SMALL.

Witnesses:
 JOSEPH E. DUNLEVY,
 PATRICK H. JEWETT.